R. M. CORL.
GLASSWARE FORMING MECHANISM.
APPLICATION FILED JUNE 9, 1909.
1,040,280.
Patented Oct. 8, 1912.
7 SHEETS—SHEET 1.
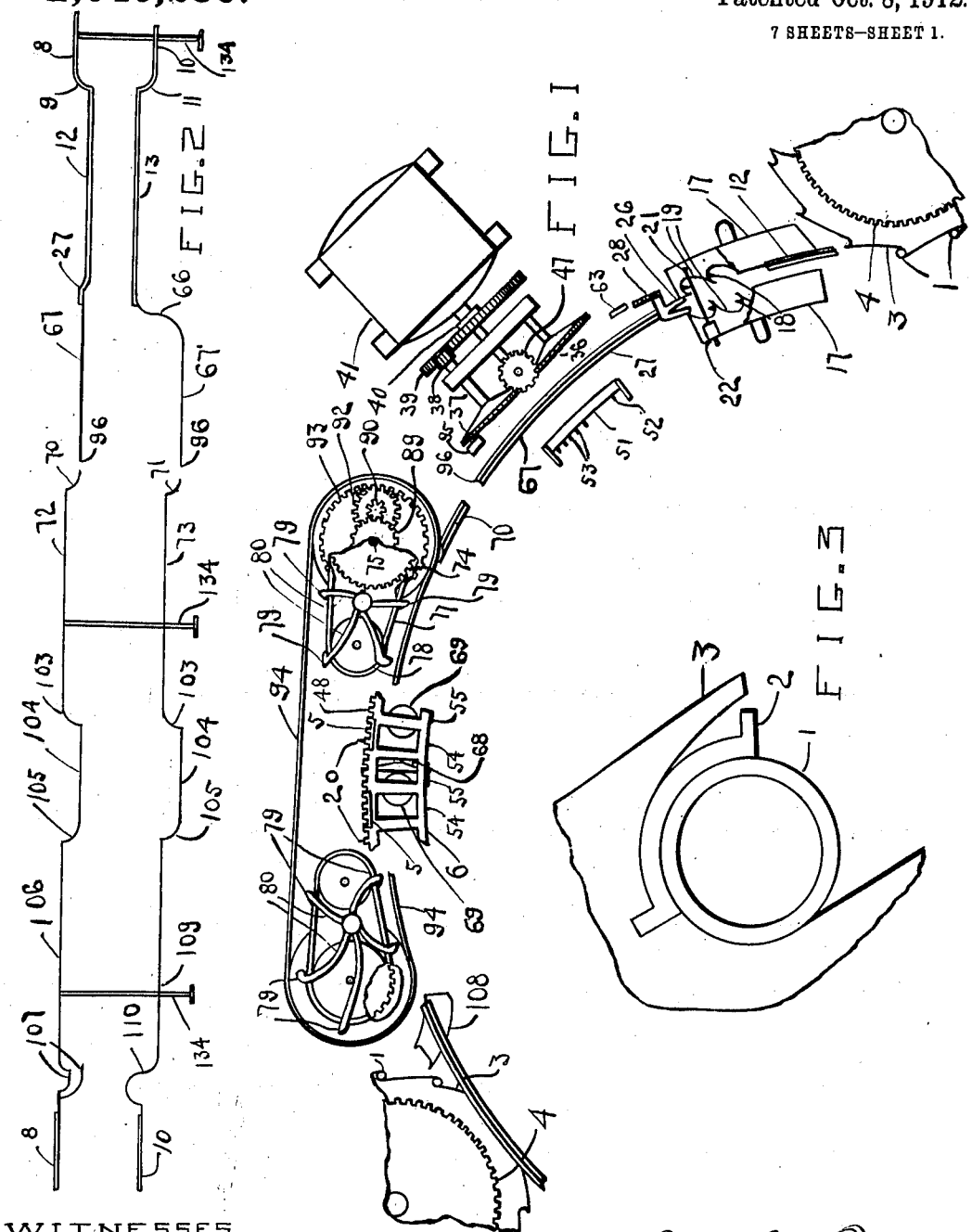
WITNESSES
O H Rauch
Helen Worden
Robt M Corl
INVENTOR
BY Geo Kirk
ATTORNEY

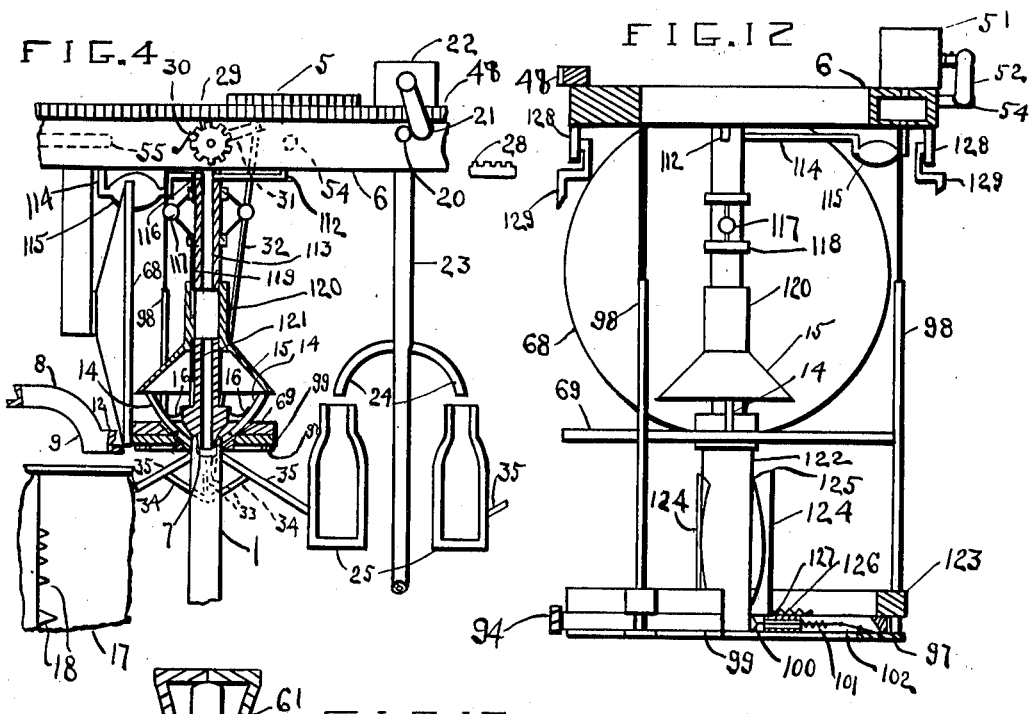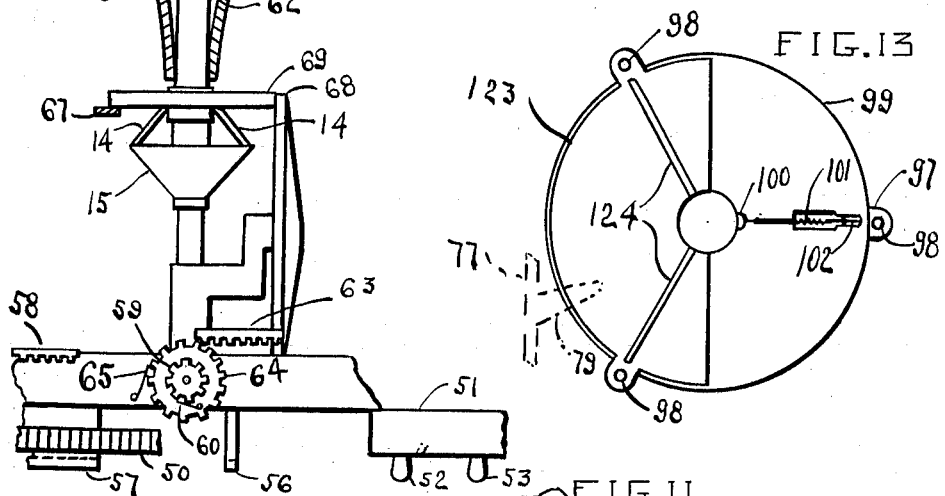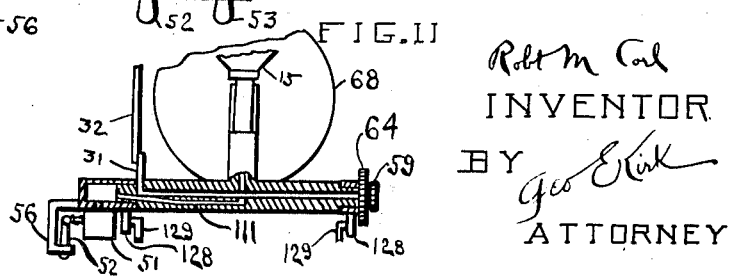

R. M. CORL.
GLASSWARE FORMING MECHANISM.
APPLICATION FILED JUNE 9, 1909.
1,040,280.
Patented Oct. 8, 1912.
7 SHEETS—SHEET 3.
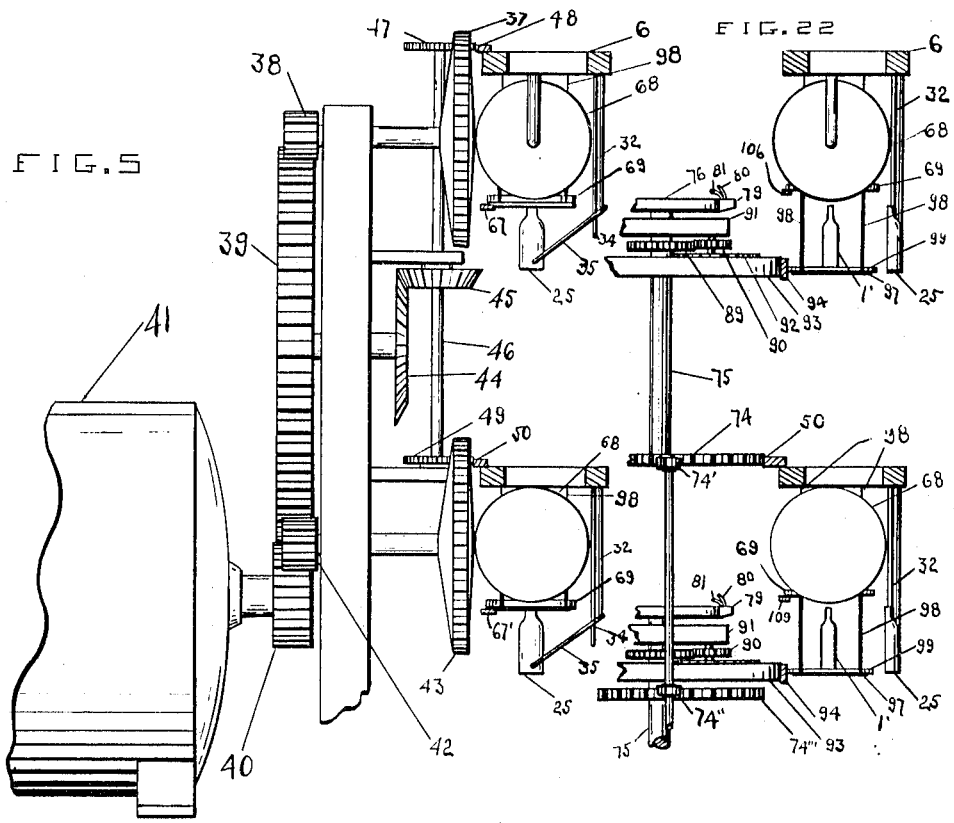
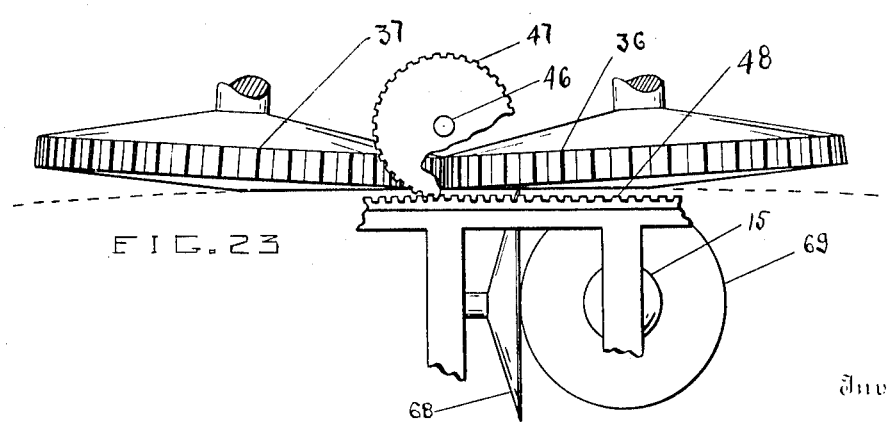
Witnesses
Gladys Jameson
Inventor
Robt M Corl
By Geo E Kirk
Attorney

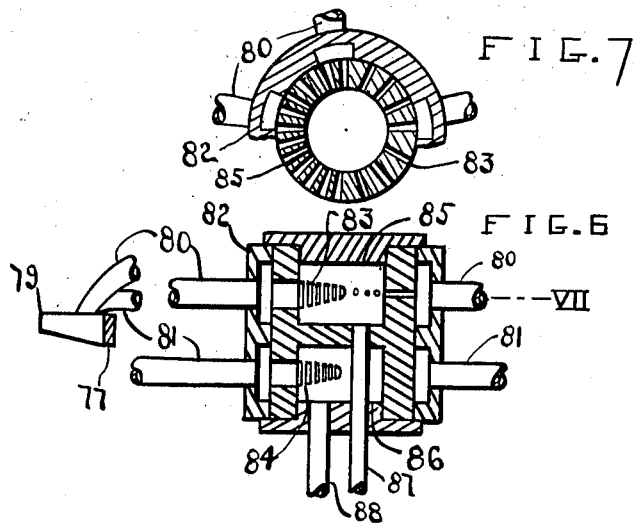
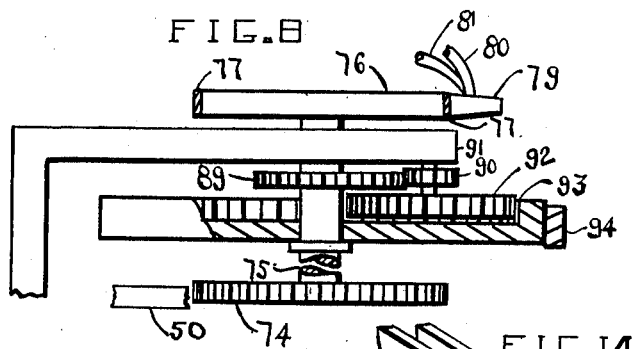
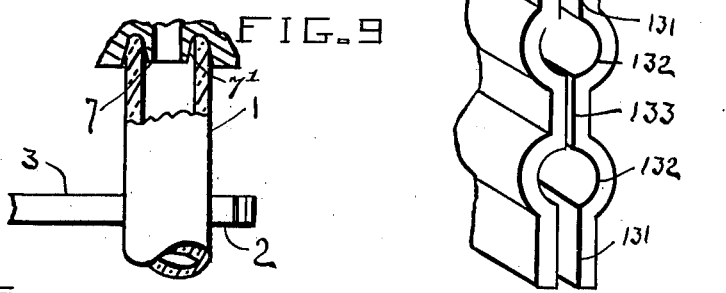

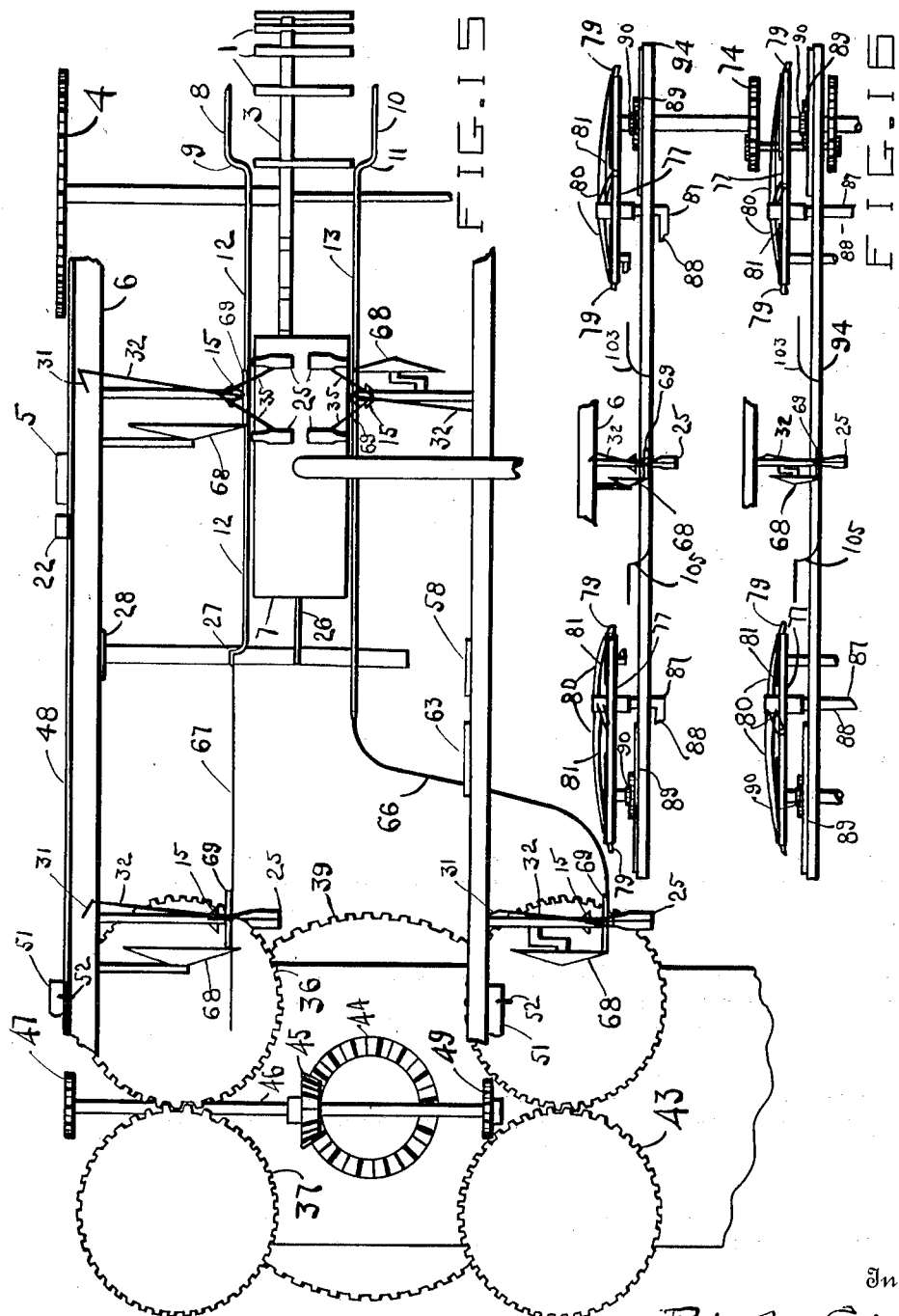

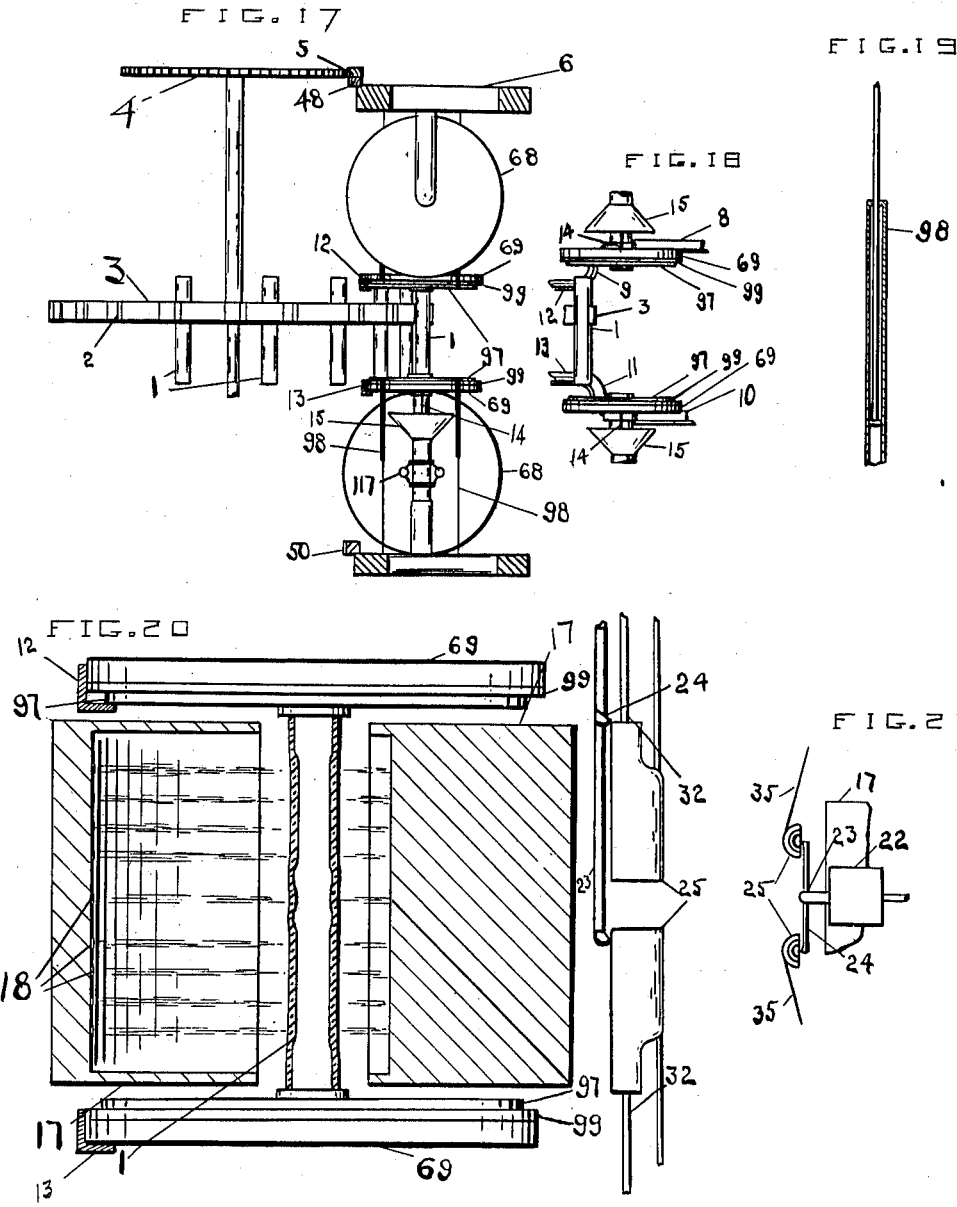

R. M. CORL.
GLASSWARE FORMING MECHANISM.
APPLICATION FILED JUNE 9, 1909.
1,040,280.
Patented Oct. 8, 1912.
7 SHEETS—SHEET 7.
FIG. 24
FIG. 25
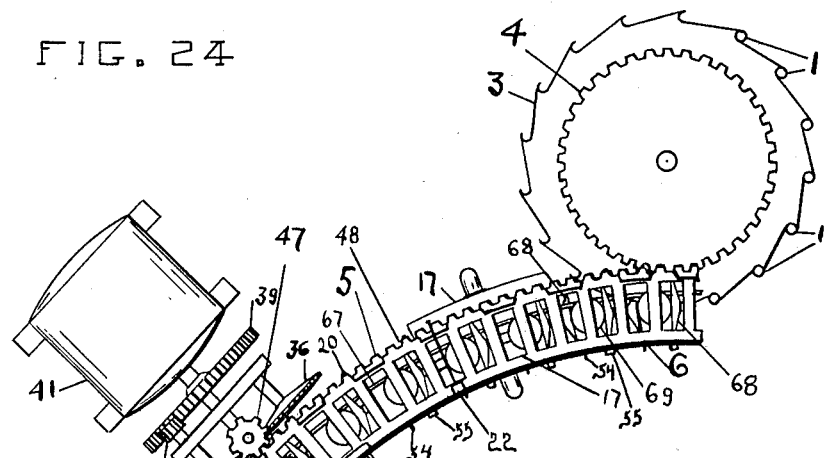
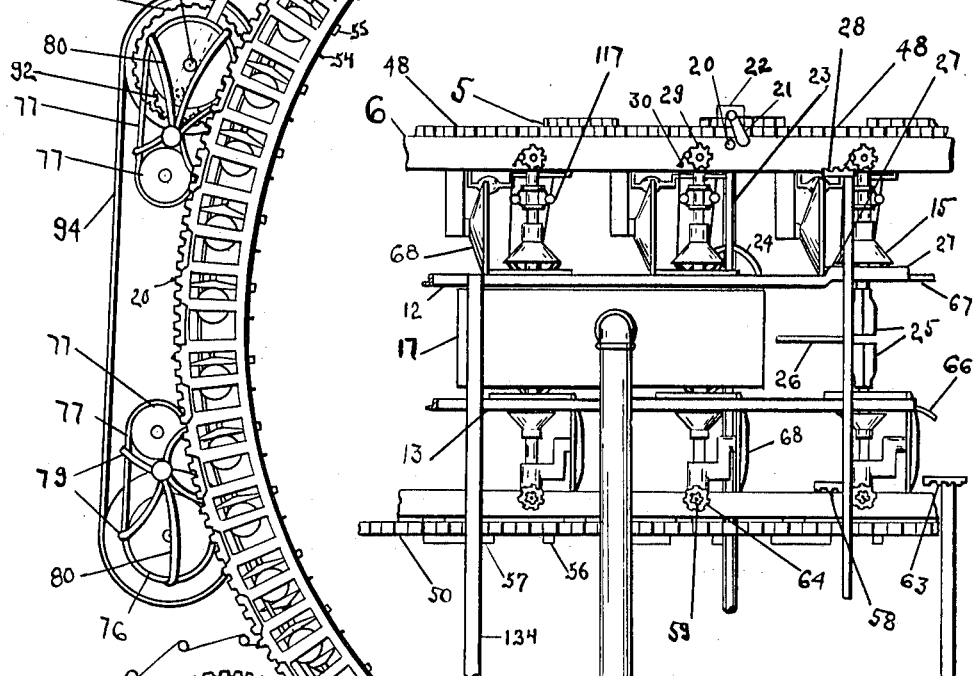
Witnesses
Inventor
Robt M Corl
By Geo E Kirk
Attorney

UNITED STATES PATENT OFFICE.

ROBERT MACHEY CORL, OF TOLEDO, OHIO, ASSIGNOR TO THE MECHANICAL PROCESS MANUFACTURING COMPANY, OF TOLEDO, OHIO, A CORPORATION OF OHIO.

GLASSWARE-FORMING MECHANISM.

1,040,280.  Specification of Letters Patent.  Patented Oct. 8, 1912.

Application filed June 9, 1909. Serial No. 501,126.

*To all whom it may concern:*

Be it known that I, ROBERT M. CORL, a citizen of the United States, residing at Toledo, Lucas county, Ohio, have invented new and useful Glassware-Forming Mechanism, of which the following is a specification.

This invention relates to handling and forming material.

This invention has utility when embodied in mechanism for producing articles from semi-plastic substances, especially heated tubular blanks of glass.

Referring to the drawings: Figure 1 is a plan view, with parts broken away, of an embodiment of the invention as adapted to handle glass blanks of tubular form; Fig. 2 is a development in elevation of the controlling track feature of the device; Fig. 3 is a plan view in fragmentary detail of the holding clip feature of the supply device; Fig. 4 is a front elevation, partially in section and with parts broken away, of an article or blank holder and connected features; Fig. 5 is an elevation, with parts broken away of the driving mechanism and graduated speeding up device with the carrier in position adjacent thereto; Fig. 6 is a fragmentary detail in vertical section of fluid control for the traveling heater device; Fig. 7 is a section on line VII Fig. 6; Fig. 8 is a view in elevation, partially broken away of a driving device and traveling heater adapted to be driven from the traveling holder; Fig. 9 is an enlarged detail, partially in section, showing the holding device position as to the blank; Fig. 10 is a view similar to Fig. 4 of the opposing or invertible traveling holder; Fig. 11 is a fragmentary transverse section of the lower carrier; Fig. 12 is a vertical section through the annular traveling holder adapted to shape an article in a former which is not continuous; Fig. 13 is a plan view of one of the holders and the former feature of Fig. 12; Fig. 14 is a perspective view of a former through which the blank may travel during its rotation to be re-formed; Fig. 15 is a fragmentary view in elevation of a portion of the mechanism from the blank feeder to the friction disk driving mechanism; Fig. 16 is a view of the driving mechanism following the showing in Fig. 15 to complete a cycle of operations on a blank, these Figs. 15 and 16 being as seen looking from the center of the machine, and with parts broken away to better illustrate the sequence of the devices; Fig. 17 is an elevation with parts broken away of the feed device with the carrier in position to remove a blank; Fig. 18 is a fragmentary view of the carrier about to clamp a blank as presented by the feed device; Fig. 19 is a detail in section of the telescopic disk carrying rods, showing a flange upon one to coact with a head upon the other to limit movement; Fig. 20 is a fragmentary view showing transverse section of the heater with a blank therein and mold sections adjacent; Fig. 21 is a fragmentary plan view on a reduced scale showing mold sections adjacent the heater; Fig. 22 is a transverse section of the carrier, with parts broken away, showing the articles in position for fire finishing the tops thereof; Fig. 23 is a plan view of the speeding up device showing in dotted line the travel of carrier disk to driving contact first at center of one friction disk of the device, traveling to its periphery and thence from periphery to center of the second friction disk of the device, where it leaves the device; Fig. 24 is a plan view, similar to Fig. 1, but with less broken away; and Fig. 25 is a side elevation from the outside of the device looking toward a portion of the mechanism adjacent the burner.

Blanks 1 in the form of open ended cylinders of glass of double length as to the size of ware to be produced, are fed to be held by clips 2 into the rotary supply device 3 having the gear 4 coacting intermittently with the toothed sections 5 of the annular carrier frame 6. These clips 2 embody a spring arm at one side of an opening (Fig. 3) to yieldingly embrace the tube blank. Each toothed section 5 is of sufficient length to rotate the supply device 3 a sufficient distance to bring the next blank 1 in position under a holder 7. When at this point, the track 8 (Figs. 2 and 15) is provided with a bend 9 which permits the holder 7 to drop into position, (Fig. 4) as guided by its central beveled portion 7', onto the blank 1. Simultaneously, the lower track 10, has an upward bend 11 actuating the lower and opposing holder 7 (Figs. 17, 18), so that the blank 1 is engaged at each end, and by continued travel of frame 6, the blank is withdrawn from the supply device 3.

The blank 1, held between the holders by the control portions 12, 13 of the track, and rotated by coaction with said tracks as shown in Fig. 20 passes through a heating device. That the blank may be more firmly held than by the beveled seat of the inner portion of the holder 7, holding jaws 14, (Fig. 4) controlled by cone 15, are thrown to grip the blank 1, by springs 16, as the holder 7 is lowered away from the cone 15 to permit of this gripping action.

The heater 17 is shown as comprising opposing oven or burner housing sections with oppositely curved heat deflecting walls 19, that the blasts from the burners 18 may be given a swirling action and thus envelop the rotating traveling blank. The burners 18 are so banked and controlled that the blank is medially heated to permit of severing, while on each side of the middle, regions are heated to thicken the glass as crowded by the holders and also render those regions in proper plastic condition for the reforming desired.

While the blank is traveling through the heater 17, a trip pin 20 carried by frame 6 engages handle 21 of a valve to control water supply from box 22, that the traveling frame 6 may receive from this fixed source a rush of water in passing, which will not affect the blank owing to the intervening heater. The spring returned handle 21 (similar to spring return valve handle 52) of the valve cuts off the water as soon as pin 20 is past, while the water so received passes by duct 23 (Fig. 4) and through nozzles 24 to spray or wash mold sections or formers 25, each wash being effective for the upper and lower mold sections on the forward side of one pair of holders and on the after side of the next set of holders in advance. This relation of the parts is shown in Fig. 4.

The blank 1 after traveling and rotating through the heater 17 is medially intersected by the converging jaws of the severing device 26, which tends to divide the blank into upper and lower portions each having a closed end. The bend 27 in the control track lifts the sections or portions somewhat apart to aid in the severing, as well as to space the blanks so that the formers may be admitted to close fully about each portion.

After passing the severing device, rack 28 mounted on the same floor bracket as severing device 26 (Figs. 1, 4 15) intercepts pinion 29, normally held against rotation by the spring pawl 30. Rack 28 is of sufficient length to rotate the relatively traveling pinion 29 sufficiently so that the pinion may throw crank 31, and through links 32, 33, 34, and levers 35, bring the mold sections 25 into closed relation about the severed blank portions. These parts 25, 29, 31, 32, 33, 34 and 35 are carried on the carrier adjacent the blank holder.

With the mold in position about the blank, the carrier 6 brings the holder adjacent the driving mechanism comprising the friction disk 36 driven from similar disk 37. Disk 37, through pinion 38, gear 39, and pinion 40 is driven from the motor 41 (Figs. 1, 5). Similar to pinion 38, is pinion 42 connected to drive friction disks similar to 36, 37, and shown in Fig. 5 as connected to one thereof 43. This lower set of friction disks acts to drive the lower blank holder in the same manner that the upper set drives the upper holder.

The carrier 6 is driven by bevel gear 44, from gear 39, which gear 44, meshes with gear 45 on shaft 46 carrying pinion 47 meshing with rack 48 of the upper annular carrier, while gear 49 at the opposite extremity of shaft 46 engages rack 50 to cause the lower annular carrier to travel in synchronism with the upper carrier (Figs. 5, 23).

With the former in position about the blank and the travel of the blank and its holder passing the driving mechanism, provision is made to aid in the forming by supplying a fluid within the blank. Fixed fluid supply vessel 51 (Figs. 1, 10, 11, 12) is provided with a plurality of valves having spring actuated handles 52, 53, normally in closed position. The carrier 6 in its travel has pin 54 intercepting handle 52, to supply a puff of air to the blank, while in further progress of the carrier, trip 55 is of sufficient length to rock the valve handle so that at least one of the valves opens to keep up pressure in the blank. The lower carrier (Fig. 10) is provided with trips 56, 57, similar to trips 54 and 55 of the upper carrier.

The lower carrier has its mold sections thrown by the fixed rack 58 contacting the traveling pinion 59, which is normally held from rotation by the spring pawl 60 (Fig. 10). With the mold sections 61, corresponding in general with sections 25 of the upper carrier, and which sections or formers may be of such type as to answer in making bulbs, bottles or ware in hand, and surround an upstanding blank portion 62, the carrier comes to fixed rack 63, which meshes with pinion 64. This pinion 64 is normally held against rotation by the spring pawl 65. This rack 63 causes the traveling pinion 64 to invert the lower carrier, following the bend 66 in the lower control track (Fig. 15).

Control portions 67 and 67' of the track are unflanged, so that friction disks 68 may effectively coact with holder rims 69 and thereby from the driving mechanism have speed of rotation starting from zero as the carrier first brings disk 69 to contact with disk 36 near its center, (Fig. 23) rise to a maximum as continued travel takes to the periphery of disk 36, while in passing to the center of disk 37 the speed is again brought to zero.

While traveling through the heater 17 (Figs. 1 and 15) and being severed by the device 26, the blank is rotated by the disks 69 coacting in their travel with the flanged control tracks 12 and 13.

After passing through the forming operation of high speed rotation from disks 36, 37, 43 assisted by supply of fluid within the blank from ducts 111, 112 to help in the expanding operation, bends 70 and 71 in the control tracks (Fig. 2), lift the holders 7 off the blank or ware tops, and the travel is continued along portions 72, 73 of the control tracks. In this travel there is provision made for heating the top and simultaneously imparting high speed rotation. The heater shown is of the traveling type and is connected up to move in synchronism with the carrier so that its jet may play properly on the rotating traveling ware. This is done in this instance by providing gear 74 to mesh with traveling rack 50 (Fig. 8). This gear 74 is mounted on shaft 75 to drive wheel 76 carrying the endless band 77 provided with burners 79 spaced to automatically have range on each succeeding blank as it is carried past. These burners are fed by flexible gas ducts 80 (Figs. 1, 8 and 16) and air ducts 81 from a chambered rotary head 82 (Fig. 7) passing gas ports 83 and air ports 84 communicating with gas supply chamber 85 and air chamber 86, fed by pipes 87, 88. In this rotation the ports vary in size so that the blast is automatically regulated. On the return side, that is away from the traveling ware, the air is shut off, and gas supply is just sufficient to maintain light. The driving device, in this instance is shown as driven from the carrier, instead of from a separate source of power. On the shaft 75 is fixed the gear 89 in mesh with pinion 90 carried by the frame 91. This pinion 90 serves through gear 92 to drive the annular gear 93 which carries the endless band 94 positioned to contact the rims of the blank holders, and thus impart rotation to the ware.

The heating, molding and fire-finishing of the top of the article is accomplished for the lower portion of the carrier in a similar manner to the upper, from which upper device power is derived through pinion 74', transmitting to pinion 74" driving the gear wheel 74'" corresponding to gear wheel 74.

On passing the driving disk 37 (Fig. 1) rack 95 similar to rack 28 but the other side up, is provided to release the mold sections 25 by reversing the movement caused by rack 28, the holder 7 still retaining the ware, while break 96 in the control track 67 permits frame 97 guided by telescoping rods 98, to fall. This movement away from clamp or holder 99, permits the gripping jaws 100 to be drawn away from the article (Fig. 12) by the spring 101, as lever 102 is free to rock with frame 97 away. So released, holder 99 drops to the frame 97, in contacting which it automatically clamps the ware by its weight acting to rock the levers 102 to throw the jaws 100 toward the ware against the resistance of springs 101. With this holder gripping the ware, the bend 70 releases upper holder 7 by lifting it, and band 94 engaging holder 99 rotates the ware. While burners 79 play on the top portion to soften that the bends 103 of the control tracks cause lowering of the holders 7 to act as formers for the relatively rotating ware (Fig. 12), in passage along control portions 104 of the tracks. When formed, bends 105 lift these holders 7 while the second series of fire finishing burners 79 may play on the article 1' as shown in Fig. 22, during all of which period the ware is rotated by the band 94. This portion 106 of the upper track terminates in a dip and pick up portion 107. The dip permits holder 7 to grip the ware, while 107 lifts holder 99 off frame 97 to thus free the lower holder. So freed, the up portion of the dip releases upper holder 7 that the ware may fall on chute 108. The lower control track has portion 109 in passage through fire finishing, which terminates in double bend 110 serving to invert the lower holder 7 and thereby free the ware that it may fall on the chute. This inversion of the lower holder brings it into position for engaging the lower end of a new blank and performing therewith in a similar manner as recited. The cycle of operations then starts anew on portions 8, 10 of the control tracks, which are annular, and thereby automatically handle ware through the grouping of devices for continuous production.

In supplying fluid to the pivotally mounted lower holder, duct 111 is provided as shown in Fig. 11. For the direct or first puff of air to the upper holder duct 112 (Fig. 4) is shown as communicating with the passage 113 leading to the holder 7. For the second or graduating air supply, duct 114 having a resilient section 115 is adopted The resilient section serves to modify the pressure by rendering it more uniform. To further temper the pressure, closure 116 for duct 114 controls the feed into passage 113 by action of the fly ball device 117, permitting more air as the device is speeded up by disks 36, 37. The fly ball is driven through its lower fixed collar 118 connected by spline 119 to the telescoping section 120, coacting with spline 121 to be driven from the rotatable holder 7.

In the shaping of ware, instead of providing formers affording practically continuous enveloping walls for the blank, the rotating blank may be disposed to have rotation relative to forming ribs. In Fig. 12, the blank 122 is shown as held by holder 99, while disposed between this holder 99 and the holder rim 69 is the frame 123 carrying former ribs 124 with beveled upper portions, so that by the movement of frame 97 to a position adjacent the rim 69, these bevels 125 may slide against the rim 69 and thus be forced into slot seats in the frame 123. Springs 126 serve to throw the former ribs into upright position when the movement of frame 123 away from rim 69 permits. As this frame 123 reaches the holder 99, the heels 127 of the ribs 124 rest on the holder 99 and thus lock the ribs in position and firmly so hold them during the rotation of the blank therein while the forming operation is taking place.

The annular carriers are sustained during their travel by rollers 128 mounted in brackets 129 mounted on the floor.

In this disclosure it is to be noted that applicant provides means for holding the ware during its subjection to the action of devices together tending to produce a finished and complete article. Provision is made for relative rotation between the subject acted upon and the former and heaters, and instead of having the devices travel to the ware, the ware travels as to certain of the devices. As showing the further development of this phase, the ware may travel even as to the formers in a similar manner in its travels to the heaters, Fig. 14 showing this adaptation for the production of a pair of tubulated electric lamp bulbs. The heated blank, rotating in its travel, having the portions to be reformed approaching a plastic condition, is gradually worked into the space between the formers 130 which are fixed. These formers have the normal spacing 131 near each terminal for unchanged portion of the blank serving as socket ends of the bulb, while the adjoining enlarged filament holding portions 132 are connected by the reduced tubulation 133, thereby avoiding expense of tubulating for charging the bulb with a filament, removing the air from the bulb and then sealing said tubulation.

The control tracks are carried by standards 134 (Fig. 2).

Operation: The supply-device 3 is caused to move by gear sections 5 meshing with gear 4 to bring successively the blanks 1 under the holders 7 to be clamped and taken from the supply device (Figs. 4 and 15) by the travel of the carrier past bends 9, 11 in the control tracks 8, 10. The ware is then heated at points to be acted upon, while simultaneously, sectional molds 25 may be washed or sprayed through the action of trip pin 20. Forked member 26 then brings about the severing of the blank 1 as the bend 27 is reached and the two sections are drawn apart. In this travel, rims 69 have contacted the flanged control tracks to rotate the blank. After severing, the molds or formers are thrown about the sections of the blank by fixed racks 28, 58, while fixed rack 63 then inverts the lower blank carrier, so that each section of the blank may be carried extending downwardly during the forming operation. The forming is aided by rotation of the blanks from the friction disks 36, 37 of the driving mechanism, the speed starting at zero, as the wheels 68 first contact the centers of disk 36 and similar disk therebelow, while it ends up at zero as the wheels 68 leave the centers of disks 37 and 43. During this forming by rotation in the molds, provision is made for a controllable supply of fluid, being capable of most delicate adjustment—initial puff, then later continued air supply controlled by the centrifugal speed regualtor or flyball 117. Inequalities of pressure are equalized by the resilient bulb 115. The ware is now formed, and in case of bulbs would be complete. In using the molds of Fig. 14 for bulbs, they would be placed in the series of devices in place of the severing device and in position similar to the heaters 17. For completing the ware, as bottle necks, or for the handling of blanks, treatment of which might begin at this point, provision is made for heating, shaping or molding as the forming may be termed, and fire finishing. During this handling for heating, forming and fire finishing, a third form of device for rotating the ware is disclosed—the traveling band 94. For the heater, instead of having the ware travel through fixed ovens 17, jets 74 are connected up to travel at the same rate as the ware and directed to act on the terminus of the blank to cause it to approach plasticity. The port control automatically governs the intensity of this heating. On passing from this heat, the shaper or former, in this instance shown as the holder 7 is brought down, serving to give the lip to the bottle neck as shown in Fig. 9. The driving band 94 acting on blank holding rim 99 rotates the blank or ware relatively to the forming holder 7 in this stage. So formed, the forming holder 7 is removed by the lift 105 in the tracks, that a fire finishing heat may be applied to the formed bottle neck or shaped ware. The bottle so treated is completed and discharged by the control track into chute 108, and the carriers continue their travel for a repetition of the cycle of operations. The continuity of the steps and the capacity due to a possibility of close grouping of the carriers is productive of an installation of great output with a minimum of complication—the actual work throughout being automatically performed.

In the heating as disclosed in Fig. 1, the general idea embodies heating at one point for severing, and heating at points on each side of the severing point to bring to a state permitting ready re-forming. These heatings are shown as occurring at the same time, instead of successively as may often be found desirable in practice.

What is claimed and it is desired to secure by Letters Patent is:

1. A tubular blank reforming mechanism, comprising a heater for a portion of the blank, a holder having on the under side thereof engaging means for suspending the blank, and mechanically controlled driving means coöperatively interconnected in the mechanism to expose the blank to the heater, said means including a former controlled by the mechanism to act on the heated blank to change the form of the blank while the blank is suspended.

2. A forming mechanism comprising a rotary holder having on the under side thereof engaging means for suspending an open ended tubular blank, a movable mounting for the holder for carrying the holder laterally of its axis of rotation, a heater for the blank, and mechanically controlled driving means coacting with the mounting to effect relative translation between the holder and heater.

3. A re-forming mechanism comprising a cycle of devices including a rotary blank holder, said holder comprising a clamp embodying relatively movable sections and concentric therewith a centering portion to engage a blank between the clamp and centering portion, a heater for the blank, and in sequence therewith an expanding device for the blank embodying a fluid duct, a valve for the duct, and a controller for the valve actuated by the mechanism.

4. A glassware forming mechanism comprising a clamp holder for gripping the ware, an expanding device embodying a fluid duct discharging through the holder to the ware, said holder and a portion of said duct being relatively movable, a valve for the duct, and a valve controller graduating the supply of fluid to the duct, said controller connected to be actuated by relative movement of the holder to a portion of the duct.

5. A glassware forming mechanism comprising a clamp for gripping the ware, an expanding device embodying a fluid duct discharging through the clamp to the ware, and a trippable controller actuable by relative travel of a portion of the duct to the holder to permit a puff of fluid into the duct.

6. A glassware forming mechanism comprising a clamp holder including relatively movable sections for engaging the ware, an automatic expanding device embodying a fluid duct discharging through the holder to the ware, and controlling means therefor actuable by relative travel of the holder and a portion of the duct, said means including a trippable connection to permit a puff of fluid into the duct and a graduating controller for raising the pressure in the duct.

7. A glassware forming mechanism comprising a sectional holder for the ware, an automatic expanding device embodying a fluid duct to the held ware, said device having a resilient section effective to equalize the fluid pressure in the duct, a supply valve for the section, and a controller for the valve actuated by relative movement of a portion of the duct to the holder.

8. A glassware forming mechanism comprising a ware supplying device, a holder having on the under side thereof engaging means to engage the upper end of ware from the supply device, said holder in addition to its travel, having actuating means to effect movement relatively to the ware in the supply device to engage such ware, a heater to act upon the upright ware in the holder, a former of contour to shape the ware, mechanically controlled driving means for bringing the former and ware into operative position, and means for rotating the ware as to the former.

9. A glassware forming mechanism comprising a supply device, a holder having on the under side thereof means to engage a charge from the device, a heater to act upon the charge in the holder, a former of contour to shape the charge, mechanically controlled driving means for bringing the former and charge into operative position, and a variable speed driving mechanism effective to gradually bring the charge up to normal speed of rotation.

10. A glassware forming mechanism comprising a supply device, a normally rotating holder having on the under side thereof means to receive and engage a charge from the supply device, a former of contour to shape the charge, mechanically controlled driving means for bringing the former and charge into operative position, and variable speed driving mechanism connected to cause an increase in the relative rotation between the charge and the former.

11. A glassware forming mechanism comprising a traveling holder having engaging means for the upper end of a charge, a supply device from which the holder may secure an upright charge, automatically actuated driving mechanism to move the holder toward and from the supply device, and a heater to which the holder may convey the charge.

12. A glassware forming mechanism comprising the combination with a supply device and a heater, of a holder having engaging means for the upper end of a charge, said holder receiving its upright charge from the supply device, and mechanically controlled driving mechanism to move the holder toward and from the supply device and cause the holder to carry the charge through the heater.

13. A glassware forming mechanism comprising the combination with a heater and a relatively traveling ware holder having on the under side thereof ware engaging means, of driving mechanism comprising connections to rotate the holder while the ware is being acted upon by the heater, a former of contour to shape the ware, said former and ware brought into operative position by the mechanism, and devices including variable speed mechanism causing the holder to give the heated ware increased rotative speed as to the former.

14. A glassware forming mechanism comprising the combination with a supply device, a former of contour to shape a charge, a heater, and a driving mechanism, of a relatively traveling holder having on the under side thereof engaging means for receiving the upper end of a charge from the supply device, subjecting such charge to the action of the heater to bring the charge into operative relation as to the former and to rotation by the driving mechanism relatively to the former.

15. A glassware forming mechanism comprising the combination with a supply device, a heater, a sectional former, and a driving mechanism, of a relatively traveling holder having engaging means for the upper end of a charge from the supply device and subjecting such charge to the action of the heater, to bring the charge into operative relation as to the former and to rotation by the driving mechanism.

16. A glassware forming mechanism comprising the combination with a former of contour to shape ware, of a rotary relatively traveling ware holder for presenting the ware to the former, said holder having on the under side thereof ware engaging means, said ware and former being brought into operative position by the mechanism, and a variable speed driving mechanism having connections for increasing the rotative speed of the holder.

17. A glassware forming mechanism comprising the combination with a former and a rotary relatively traveling ware holder for presenting ware to the former, of a driving mechanism for increasing the rotative speed of the holder, said mechanism including mechanically actuated connections to cause relative travel between the former and ware holder, and a fluid supply device automatically coacting to aid in expanding the ware.

18. A glassware forming mechanism comprising a device for sustaining ware in a vertical position, a heater for a terminus of the vertically sustained ware, a shaper for molding the heated terminus of the vertically sustained ware, means for throwing the shaper, and driving mechanism causing continuous travel of the device at a uniform rate during the heating and molding operations.

19. A re-forming mechanism comprising holding means for vertically disposing a blank, means for severing the blank, a trip for inverting one of the portions of the blank, and driving mechanism to cause relative travel of the holding means and severing means, and of the holding means and trip.

20. A glassware mechanism comprising a pair of clamping holders for vertically disposing a blank and a fixed narrowing crotch into which crotch the blank is movable for horizontally severing the blank between the holders.

21. A glassware forming mechanism comprising a traveling ware holder having on one side thereof ware engaging clamping means, a trip device engaging and inverting the holder during its travel, a mold for the inverted ware, and driving means to effect relative rotation between the mold and ware.

22. A re-forming mechanism comprising a blank holder, a heater for a portion of the blank, and means to engage the heated portion comprising a narrowing crotch in the line of relative blank travel, into which crotch the blank is received for severing the blank at such portion of the blank engaged by the crotch.

23. A re-forming mechanism comprising a rotary blank holder, a heater for a portion of the blank, and means for engaging the heated blank portion comprising a fixed narrowing crotch into which the blank is movable for severing the blank at such heated portion of the blank engaged by the crotch.

24. A re-forming mechanism comprising a pair of blank holders disposed one above the other to receive a common vertically extending blank, said holders having vertically opposing blank engaging means, narrowing crotch means for severing such blank by relative movement of the blank into the crotch, a former for each of the severed portions of the blank as to which formers the holders position the portions of the blank, and driving connections for rotating the holders.

25. A glassware forming mechanism comprising a supply device, a pair of holders disposed one above the other for receiving a vertically extending charge from the supply device, a heater for the charge, a severing device for the heated charge, forming means for the severed portions of the charge, driving mechanism for rotating the charge portions when subjected to the forming means, and release means for freeing the former charge portions.

26. A glassware forming mechanism comprising a traveling holder having a centering portion for entering the ware to be held, a surrounding portion embodying sections movable relatively to each other acting in connection with the centering portion to hold the ware therebetween, mechanism controlled by the holder travel to actuate the surrounding sections for engaging and disengaging the ware, and a heater to which the holder subjects the ware.

27. A glassware forming mechanism comprising the combination with a heater, and a driving mechanism, of a relatively continuously traveling holder having means for engaging the upper end of an upright charge of ware and subjecting such ware to the action of the heater and to rotation by the driving mechanism, and mechanically controlled devices for operating the ware engaging means.

28. A glassware forming mechanism comprising a ware holder embodying a centering device and a clamp embodying sections movable relatively to each other concentric with the device for engaging therebetween an upright blank, mechanism controlled by the holder travel to actuate the clamp sections for engaging and disengaging ware, and a former for the blank ware as to which former the ware may be given relative rotation by the holder, and driving means for rotating the holder.

29. A glassware forming mechanism comprising a holder for an upright article, a sectional former movable to operative position as to the article, a driving device providing relative rotation between the article and former, and heating means for the article before and after forming.

30. A glassware forming mechanism comprising a supply device, a discharge device, a traveling holder for transporting an article from the supply device to the discharge device, and a synchronously traveling heater to act upon the article carried by the holder.

31. The combination in a glassware handling mechanism of holding means for an upright article, a sectional former for the article, a fire finisher to act upon the article after the forming, said holding means maintaining the article in position as to the fire finisher during the fire finishing, and driving mechanism controlling the action in sequence of the former and fire finisher.

32. A glassware forming mechanism comprising devices automatically performing in sequence to produce ware, including a heater for the ware, a severing device to act upon the heated ware, a rotating device for turning the severed ware, a fluid supply device connected to the rotated ware to aid in the forming thereof, and means for shaping the terminus of the formed ware embodying a second heater for said ware terminus, a second former to coact with said heated terminus, and a fire finisher for said formed terminus, in combination with driving mechanism connected to present a blank to said devices in succession.

33. A glassware forming mechanism comprising a supply device, a blank holder charged by the device, mechanically actuated means for inverting said holder to thereby cause the blank to hang downwardly, and an expanding device for the inverted holder carried blank including driving mechanism for operating the holder inverting means and for rotating said holder about the axis of the blank.

34. A glassware re-forming mechanism comprising a supply device, a blank holder charged by the device, mechanically actuated means for inverting said holder to thereby cause the blank to hang downwardly, connections for supplying fluid to said inverted holder to expand the blank, and means for operating the holder inverting means and for rotating the blank on its own axis.

35. A glassware forming mechanism comprising a supply device, a blank holder charged by the device, a heater for the holder carried blank, means for inverting said holder to thereby cause the blank to hang downwardly, an expanding device for the blank, and driving means effecting relative travel of the holder from the supply device to the expanding device.

36. A glassware forming mechanism comprising a supply device, a blank holder charged by the supply device, mechanically actuated means for inverting said holder to thereby cause the blank to hang downwardly, and driving mechanism for operating the holder inverting means and for rotating the holder on the blank axis.

In testimony whereof I hereunto set my hand in the presence of two witnesses.

ROBERT MACHEY CORL.

Witnesses:
C. H. RAUCH,
GEO. E. KIRK.